United States Patent [19]

Blanco et al.

[11] Patent Number: 4,633,333

[45] Date of Patent: Dec. 30, 1986

[54] DETECTION OF INSTANTANEOUS SPEED VARIATIONS IN A TAPE DRIVE

[75] Inventors: Alfred W. Blanco; Judson A. McDowell; David A. Yeary, all of Tucson, Ariz.

[73] Assignee: International Business Machines Corporation, Armonk, N.Y.

[21] Appl. No.: 748,377

[22] Filed: Jun. 24, 1985

[51] Int. Cl.⁴ .................. G11B 27/36; G11B 27/22
[52] U.S. Cl. ............................. 360/31; 360/39; 360/73
[58] Field of Search .............. 360/39, 45, 51, 73, 360/31; 371/47

[56] References Cited

U.S. PATENT DOCUMENTS

| | | | |
|---|---|---|---|
| 3,829,893 | 8/1974 | Baichtal | 360/73 |
| 3,921,210 | 11/1975 | Halpern | 360/40 |
| 4,007,492 | 2/1977 | Rose | 360/75 |
| 4,015,799 | 4/1977 | Koski et al. | 242/203 |
| 4,170,790 | 10/1979 | Satoh et al. | 360/31 X |
| 4,171,479 | 10/1979 | Rozsa | 360/45 X |
| 4,409,628 | 10/1983 | Frimet et al. | 360/73 |
| 4,446,494 | 5/1984 | Stockham, Jr. et al. | 360/73 |

Primary Examiner—Raymond F. Cardillo
Assistant Examiner—Alyssa H. Bowler
Attorney, Agent, or Firm—James M. Thomson

[57] ABSTRACT

With high density reel-to-reel tape drives, slight perturbations in the tape path can cause instantaneous speed variations in the tape which can alter the recording density of data on the tape over a very short interval. This condition can be detected by measuring changes in recording intervals on a plurality of data tracks. Whenever all of the tracks indicate an unacceptable change in the recording interval an unacceptable speed variation has been encountered.

3 Claims, 16 Drawing Figures

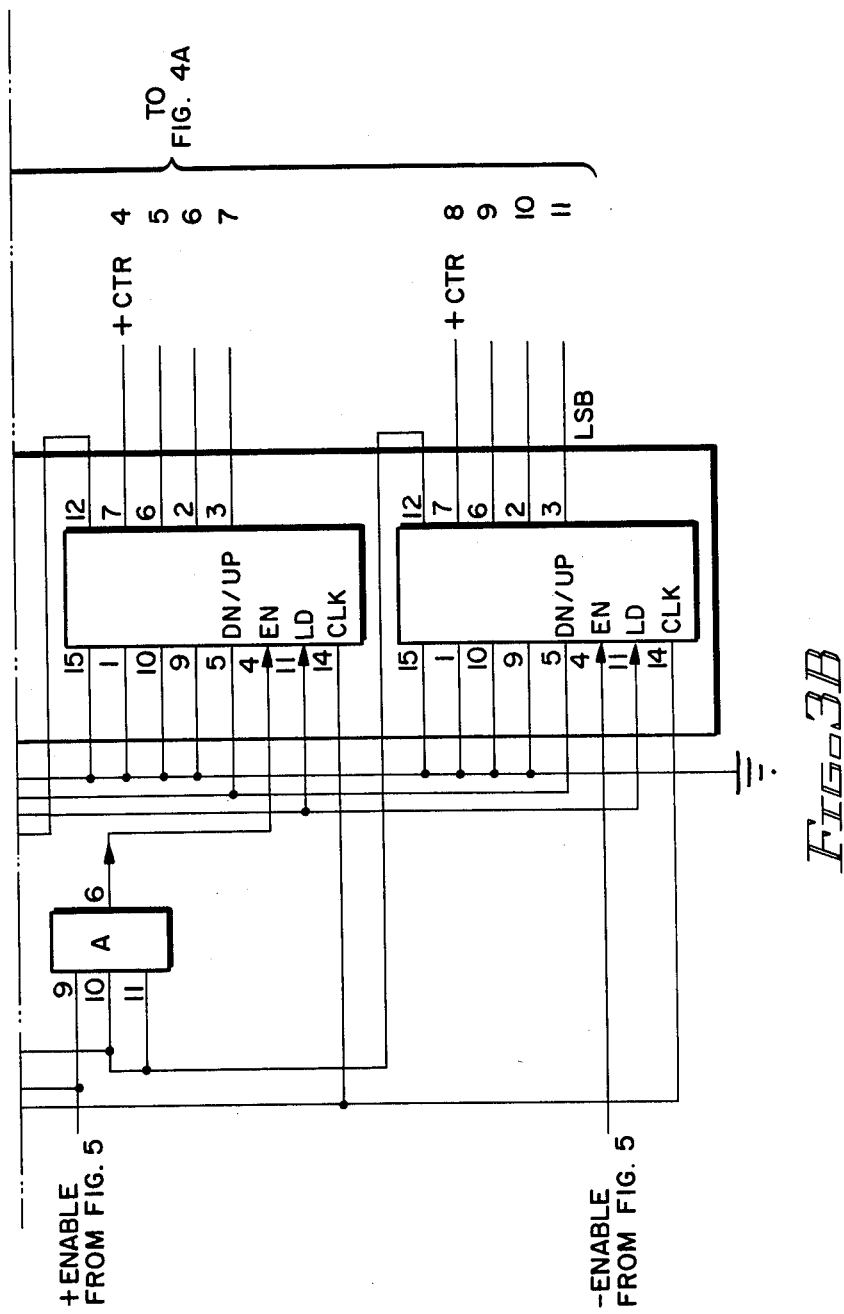

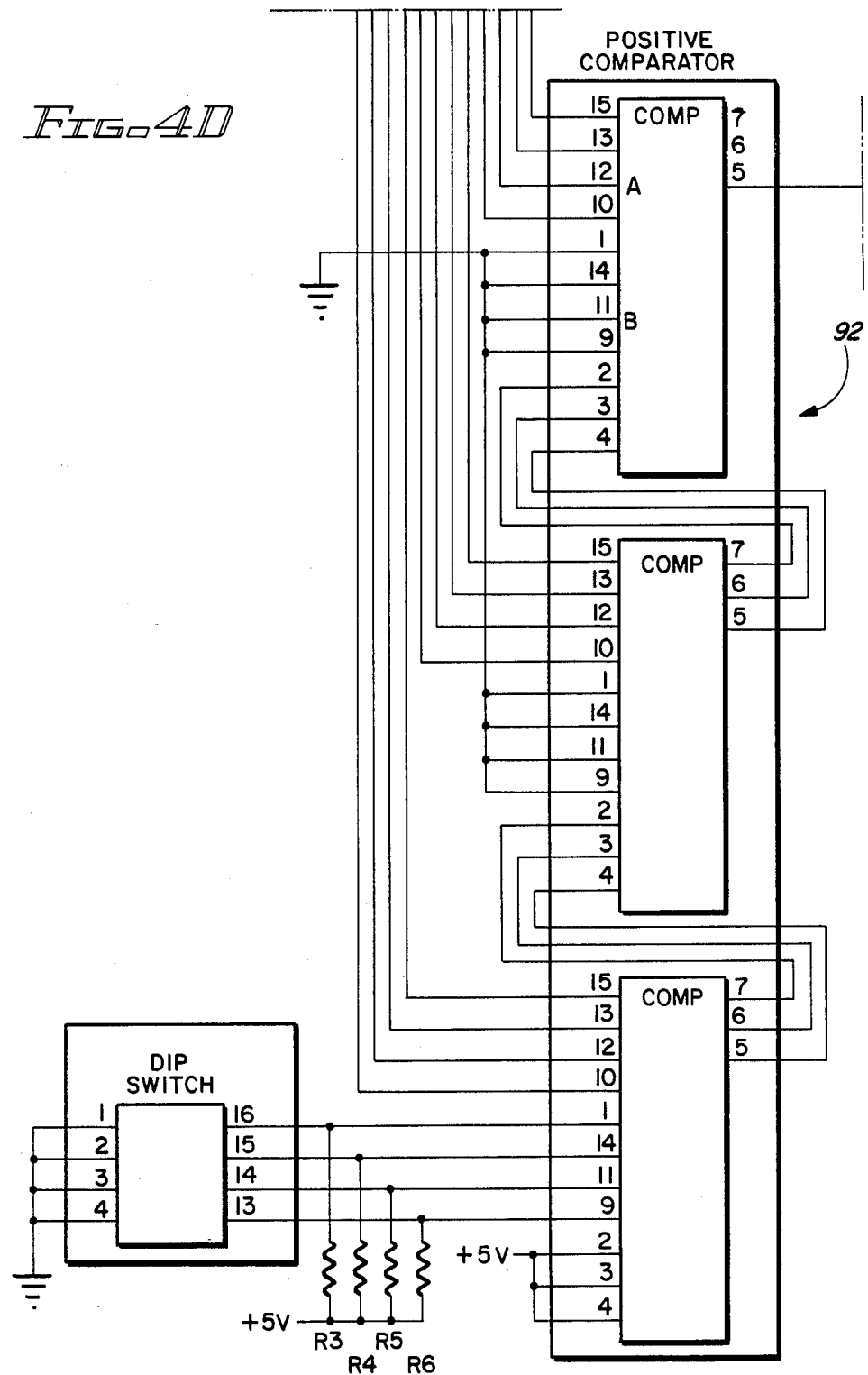

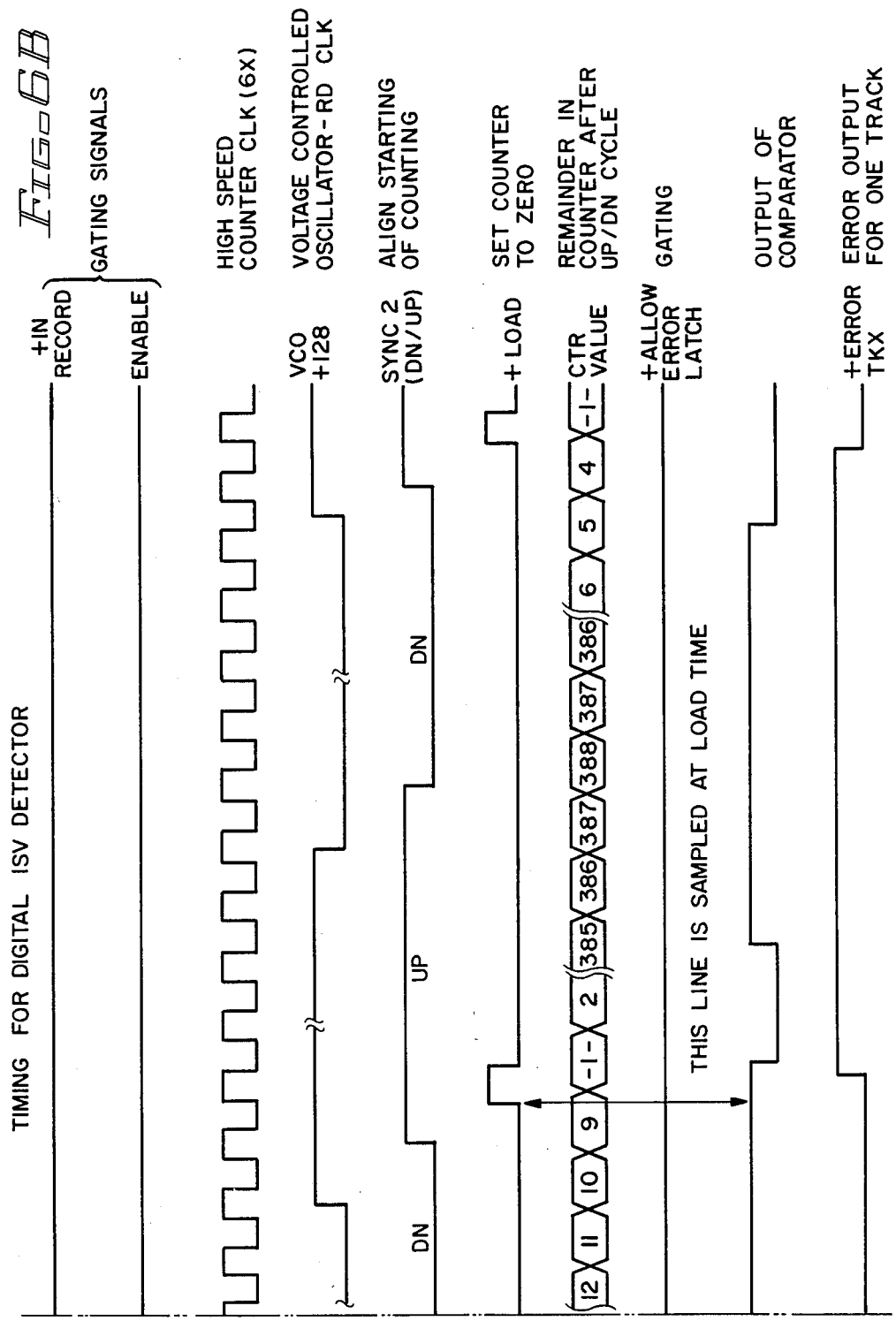

DETECTION OF INSTANTANEOUS SPEED VARIATIONS IN A TAPE DRIVE

FIELD OF THE INVENTION

This invention relates to recording and reading on multiple track media and is particularly concerned with detecting unacceptable instantaneous speed variations in a reel-to-reel tape drive which can go undetected using currently known detection techniques.

DESCRIPTION OF THE PRIOR ART

Reel-to-reel tape drives capable of recording a plurality of high density information tracks on the tape require that the movement of the tape through the recording and reading heads of the drive be tightly controlled. U. S. Pat. No. 4,015,799 assigned to the assignee of the present application describes apparatus for controlling the motion of the tape to achieve a high degree of control over the tape movement. However, it has been discovered that, even with the sophisticated control apparatus provided by U.S. Pat. No. 4,015,799, undetected instantaneous speed variations (ISV) can be encountered. These ISV's are of extremely short duration and can go undetected in a recording drive which is designed to accommodate some speed variation. It is when the ISV goes undetected that problems can subsequently develop. For example, the tape may be loaded into another drive which cannot respond as proficiently as the original recording drive and may, therefore, not be able to read the recorded data. The present invention overcomes this problem by ensuring that ISV's do not go undetected.

Various techniques for monitoring tape speed are known. For example, U.S. Pat. No. 3,439,354 to Behr et al describes a speed checker for a tape transport where the speed is determined by detecting the interval between recording a bit on the tape and detecting the bit at a read head which is a precise distance from the write head. This approach will detect the average speed of the tape between the write and read heads, however, it would not detect any instantaneous speed variations which may occur during the movement between the heads and which have become a problem with the very high density tape media which is of concern herein. U.S. Pat. No. 3,829,893 to Baichtal is another tape speed monitor where the tape speed is determined by measuring the interval between recording and reading data on the tape media. This patent also does not disclose any arrangement for detecting ISV's.

U.S. Pat. No. 4,007,492 to Rose describes apparatus for monitoring the velocity of a rotating member to ensure that the member is rotating at an acceptable speed. The rotational speed of the member is compared with an asynchronous AC line frequency. This comparison is used to determine whether a recording media is moving at an acceptable rate so that a magnetic head is positioned in transducing relationship with the media only when the motion of the media is adequate for a transducing operation. The patent does not disclose any means for detecting an ISV when recording on the media.

OBJECTS OF THE INVENTION

A principal object of this invention is to detect instantaneous speed variations (ISV) when recording on a recording media such as magnetic tape.

A further object is to detect the ISV's and rewrite the effected data to avoid subsequent misreading or non-reading of the originally recorded data.

With very high density and relatively high speed reel-to-reel tape drives, it has been discovered that very slight perturbations in tape movement over the transducing head can result in a recording which cannot be read by all other compatible tape drives. This occurs because of variations in the abilities of a different drive to respond to tape speed variations which manifest themselves as a variable data rate on the tape. The problem is particularly intolerable where the tape is originally recorded satisfactorily on a first drive and then cannot be subsequently read on another drive because the second drive cannot respond adequately to the changing data rate. Detection of these speed variations which are of very short duration is a primary object of the invention.

SUMMARY OF THE INVENTION

The present invention provides, in a multiple track digital recording system, apparatus for detecting instantaneous speed variations in the movement of the recording media. The apparatus consists of means for detecting a change in the recording rate on a preselected number of the recording tracks on the media and means for recognizing that all of the preselected recording tracks have detected an unacceptable change in the recording rate. The invention may be implemented in either an analog or a digital form. In a preferred analog form, a buffer means responds to instantaneous memory voltage changes from the preselected recording tracks, the changes in instantaneous voltages from the tracks are then summed together and the resultant compared to a threshold voltage. If the summed voltage exceeds the threshold voltage, an unacceptable data rate variation has been detected and the unsatisfactorily recorded data is rewritten. In a preferred digital form, the nominal frequency of a voltage controlled oscillator (VCO) is divided into a plurality of intervals. The frequency output of the VCO is controlled by the memory voltage output from a read circuit phase lock loop phase error detector. A high speed clock steps a counter positively during the first half of the intervals and negatively during the second half of the intervals. The counting is terminated at the end of each interval and if the count from a counter for a preselected recording track is greater than a specified minimum at the time of termination, a signal indicating a possible instantaneous speed variation is provided. The outputs of each preselected recording track detecting circuit are AND'ed so that an output indicating an ISV condition is provided only when all preselected tracks indicate such a condition.

The foregoing and other objects, features, and advantages of the invention will be apparent from the following more particular description of a preferred embodiment of the invention, as illustrated in the accompanying drawings.

BRIEF DESCRIPTION OF THE DRAWING

FIGS. 3A, 3B, 4A, 4B, 4C, 4D, 4E and 5 provide a more detailed representation of a preferred embodiment of the instantaneous speed variation detector circuit.

FIGS. 6A and 6B illustrate some of the timing signals present in the instantaneous speed variation detector circuit.

DESCRIPTION OF THE PREFERRED EMBODIMENTS

It has been discovered that, in at least some reel-to-reel tape drives, the tape path can be subject to instantaneous speed variations (ISV). Such a change in tape speed is manifested to the transducing system as a change in the data rate and can normally be accommodated by the system. However, if the change in data rate is too rapid, the system clock cannot make the required adjustments and data will be erroneously detected. As the speed variation effects the entire tape width, all tracks will simultaneously produce erroneous data. This unique condition can be used to distinguish an ISV condition from other tape error conditions which normally do not impact all tracks simultaneously.

When substantial tape speed variations occur during a write operation, the density of the data written on the tape experiences a substantial change. This change in data density creates a stress condition that may be beyond the capacity of the read operation of some tape units and, therefore, be subsequently undetectable as valid data by those units. If the variation in data density is not detected during a write check operation in the drive creating the tape, the drive may consider the data acceptable. Furthermore, the data will often be satisfactorily read on other drives. However, the stress condition may make it impossible for some drives to read the tape. Clearly, it is not acceptable to record data which can be read by some drives and not others. Of course, with severe ISV conditions, no drive will be able to read the data and, therefore, the data recording will be rejected at the outset and no subsequent problem can arise. It is with the less severe ISV conditions that we encounter a problem. The less severe ISV condition may go undetected initially and subsequently be discovered when an attempt is made to read the data on another tape drive. If the data cannot be read at that time, the data may well be totally lost. Consequently, it is essential to detect this less severe condition at the time of occurrence. The present invention provides means for detecting this less severe condition at the time of recording so that any data written during an ISV condition may be subsequently rewritten so that the recording data rate variation is maintained within tolerances acceptable to all compatible tape drives.

Figure 1:
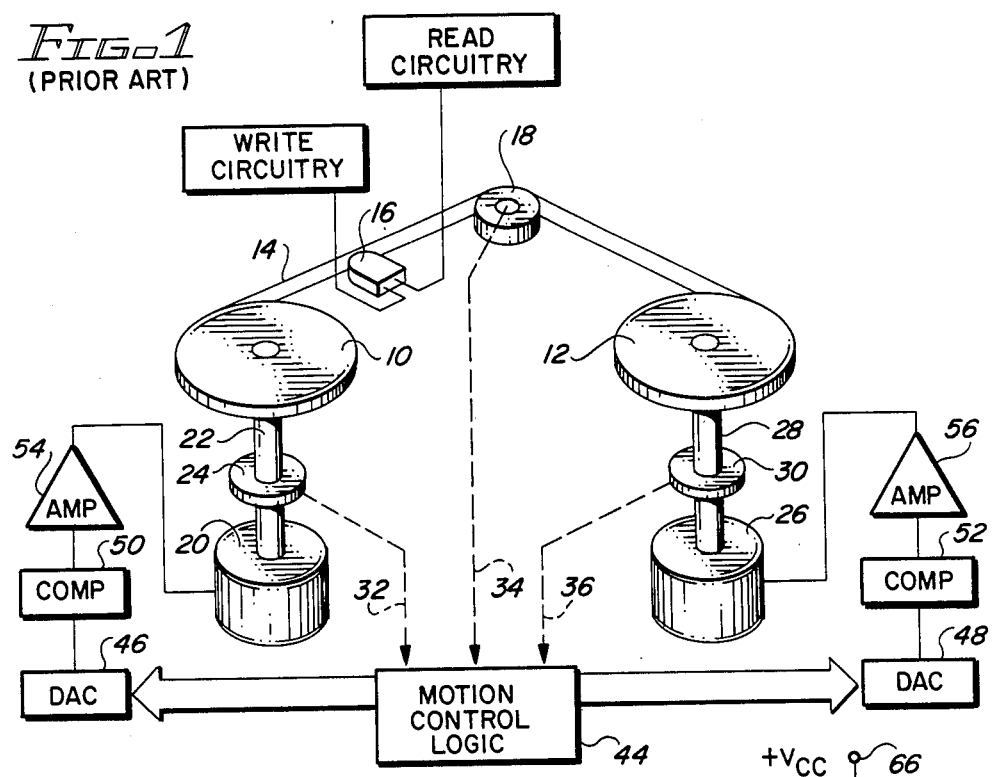
FIG. 1 is a diagram of a typical tape drive for which the present invention is useful.

FIG. 1 illustrates schematically a reel-to-reel tape drive of a type which can experience problems with instantaneous speed variations in the tape path. Even though tape 14 is tightly controlled within the tape path between tape reels 10 and 12, sudden changes of speed of very short duration may occur. For example, a sudden jump of the tape caused by non-uniform coiling of the tape on the reel, commonly described as interlayer slip, may be encountered on either reel. As shown in FIG. 1, tachometers 18, 24 and 30 detect the lineal tape speed in the tape path and the rotational speed of the tape reels. The outputs 34, 32 and 36 of tachometers 18, 24 and 30 are analyzed by motion control logic 44 which generates the necessary control signals to drive digital-to-analog converters 46 and 48. The outputs of converters 46 and 48 are fed to drive motors 20 and 26 through compensating filters 50 and 52 and amplifiers 54 and 56. By this means, the relative speeds of drive shafts 22 and 28 are closely controlled so that relatively stable tape motion is provided between reels 10 and 12. A more detailed description of the tape control procedure is provided in hereinbefore referenced U.S. Pat. No. 4,015,799. As the tape control is not part of the present invention it will not be further described herein.

However, as has been emphasized hereinbefore, even with such tightly controlled tape movement as is provided by the control system described in U.S. Pat. No. 4,015,799, perturbations of tape motion of very short duration can occur and go undetected. These perturbations must be identified at the time of occurrence if subsequent problems are to be avoided. Detection of these perturbations or instantaneous speed variations (ISV) requires a reading of the recording signal immediately after writing. Furthermore, it is necessary to obtain a reading from a sufficient number of the recorded parallel tracks such that the error, if detected, can be clearly identified as arising from an ISV rather than some other source. This can be done since errors arising from an ISV will effect all tracks, whereas, all other types of errors which would be of such short duration could only effect some of the tracks.

Figure 1A:
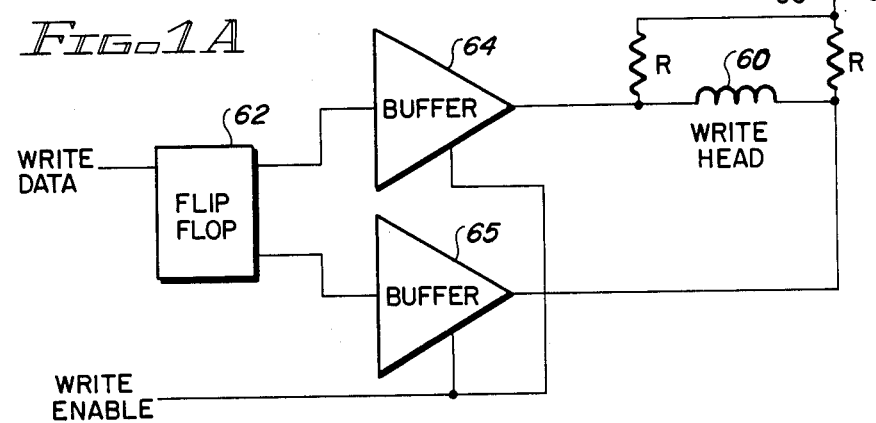
FIG. 1A is an exemplary showing of the write circuitry which may be used for each of a plurality of typical write heads.
Figure 1B:
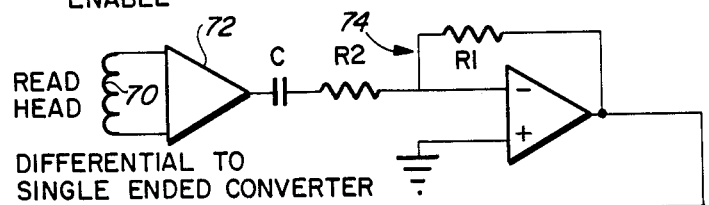
FIG. 1B is an exemplary showing of the read circuitry which may be used for each of a plurality of typical read heads.
Figure 1B:
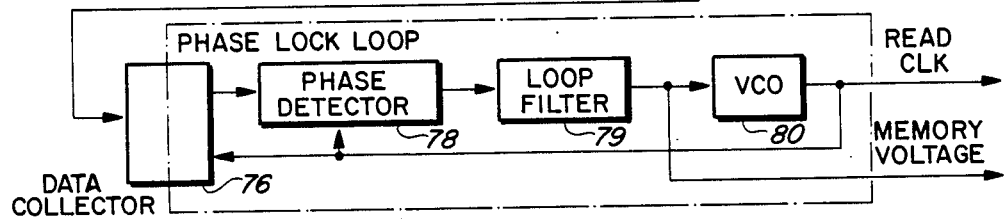

Circuitry suitable for writing and reading a plurality of data tracks simultaneously is also shown schematically in FIGS. 1A and 1B, respectively. As shown in FIG. 1A, each write head 60 receives a write data signal. The write data is provided to flip-flop 62 which provides a clipped signal to tri-state buffers 64 and 65. Buffers 64 and 65 are enabled by the write enable signal to provide write signals to head 60. A source of voltage 66 is applied to head 60 to provide current flow, thus creating the recording magnetic field in the head. Identical write circuitry is provided for each write head.

The read circuitry is shown in FIG. 1B. As with the write circuitry, the read circuitry is replicated for each read head 70. Read head 70 provides a signal to a differential to single ended converter 72 in accordance with flux changes in the recording media passing under read head 70. Converter 72 provides an output signal to amplifier 74. The amplified output is provided to data detector 76. Data detector 76 provides an input signal to a phase comparator consisting of phase detector 78 and loop filter 79 which controls the voltage controlled oscillator (VCO) 80. The phase comparator compares the phase of signals received from detector 76 with the frequency signals from oscillator 80 and thereby provides a control voltage to the oscillator 80 to alter the output frequency of the phase lock loop of oscillator 80. Oscillator 80 controls the sampling frequency of data detector 76. The memory voltage output of phase comparator 78 can be used to detect changes in the data velocity as such changes are reflected in the phase variations between the phase of the detected data and the phase of the output of the phase lock loop of the oscillator 80.

The inventors have devised two ways of detecting ISV's. The currently preferred approach is to use digital circuitry for detecting the ISV's.

Figure 2:
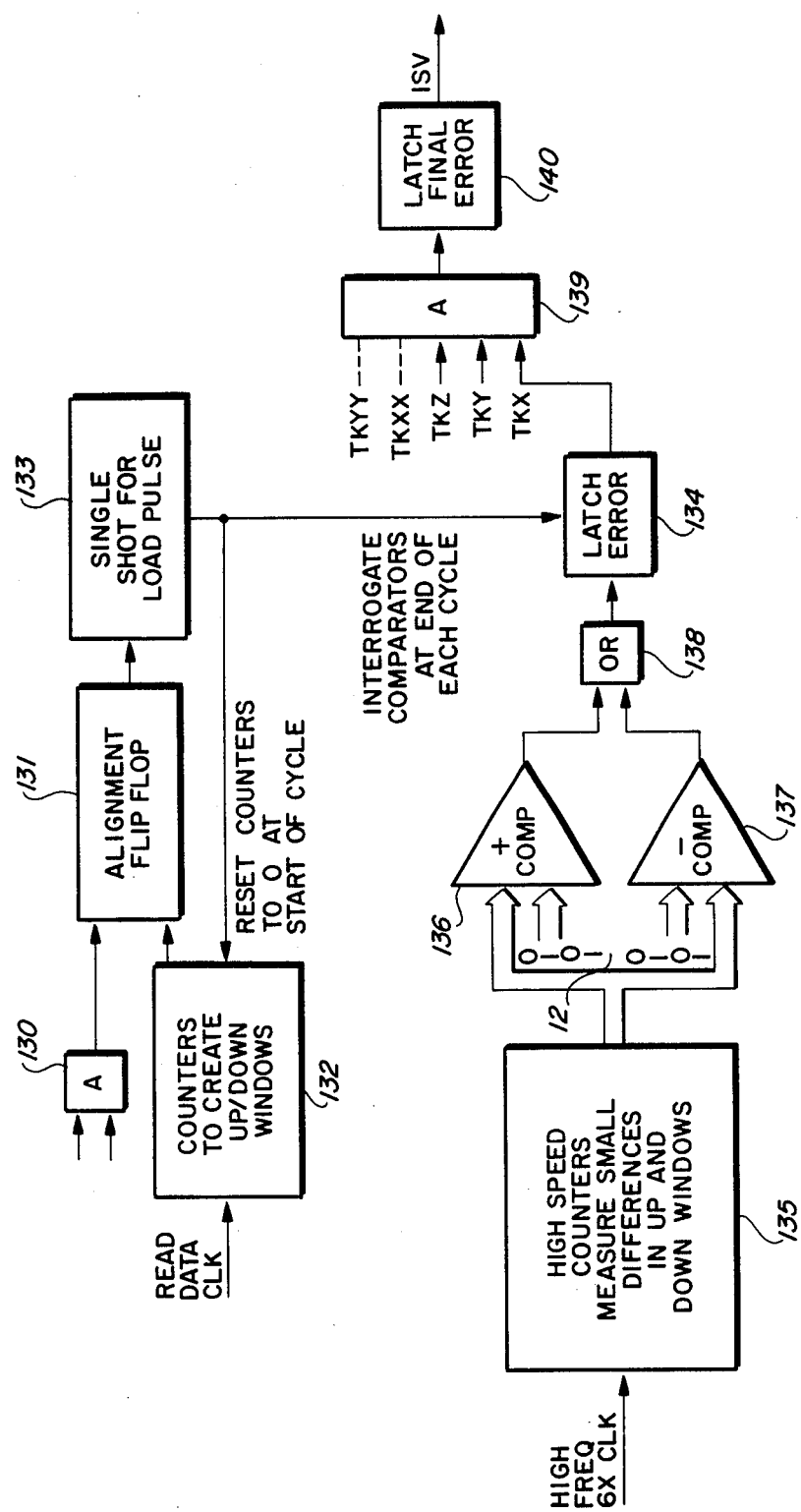
FIG. 2 is a block diagram of a digital implementation of an instantaneous speed variation detector circuit.
Figure 3A:
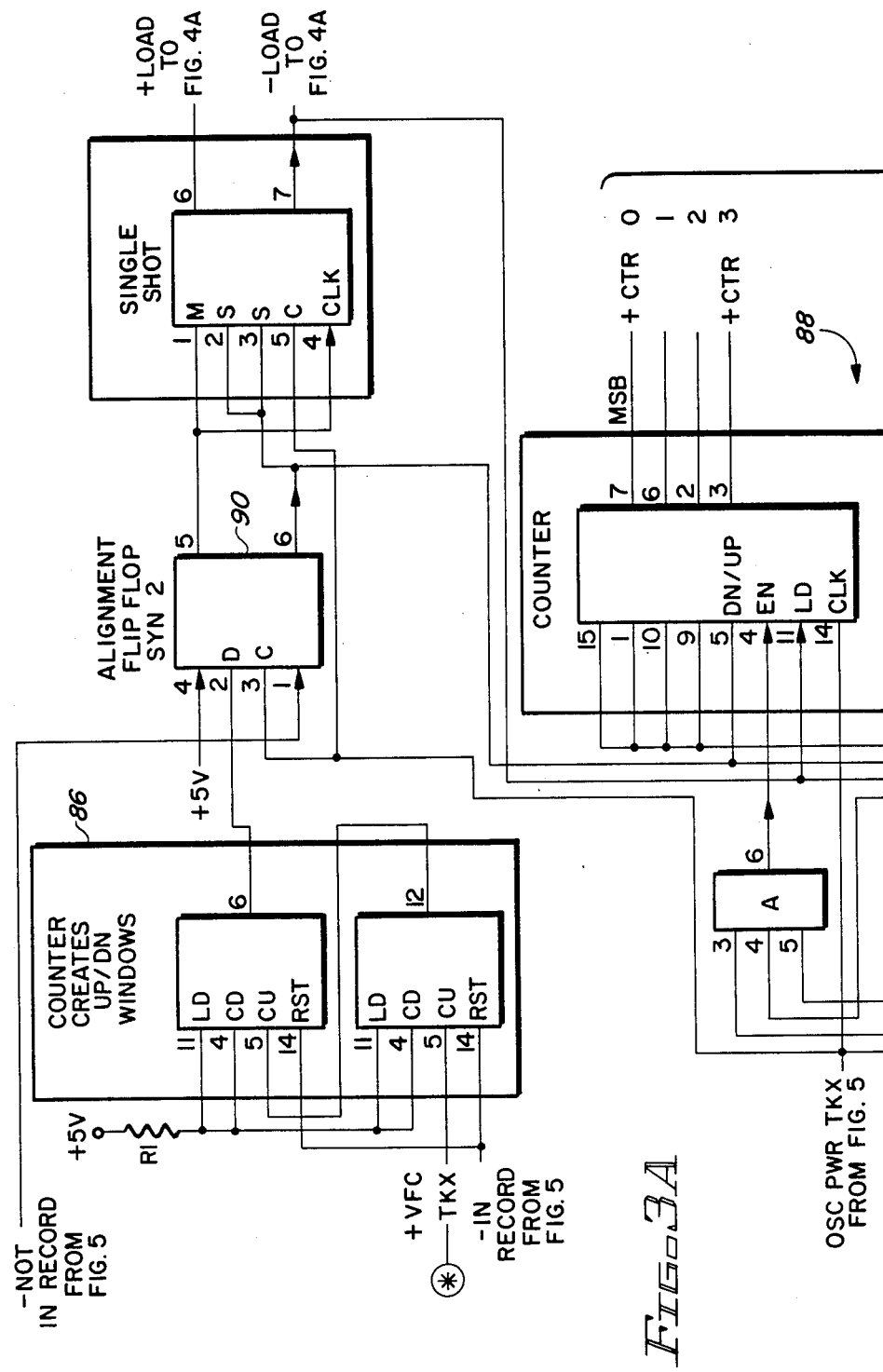

FIG. 2 shows a block diagram of a digital ISV detector. A gate 130 provides a signal to an alignment flip-flop 131 to ensure that the flip-flop 131 is only active when data is over the head. This prevents any attempt to detect for ISV's in inter block gaps where it is acceptable for the drive to start and stop. A read data clock signal from a voltage controlled oscillator, such as 80 in FIG. 1B, is provided to a first set of counters 132 to establish up/down windows for starting each cycle and ending the previous cycle. The length of the up and down windows is established by the output of the voltage controlled oscillator. The alignment flip-flop 131 provides an output signal to the single shot 133. The single shot 133 provides a load pulse to interrogate an error latch 134 and reset the counters 132 to start another cycle. A high frequency clock signal is provided to a high speed counter 135 during the interval initiated by the load pulse. The counter counts in a positive direction during the up window portion of the cycle and in a negative direction during the down window portion. The output of the counter 135 is provided to positive and negative comparators 136 and 137, respectively, at the end of the cycle. The comparators 136 and 137 determine whether the count held in the counter exceeds a predetermined positive or negative number. If either comparator 136 or 137 indicates that the count is too high or too low then an OR circuit 138 provides a signal to the error latch 134 which provides an error signal to an AND gate 139. The circuit so far described is provided for each selected track. The outputs from the error latches for each circuit are combined in AND gate 139 so that a final error latch 140 is set only when each of the selected tracks identifies an error condition. A positive output from the final error latch 140 indicates that an instantaneous speed variation has been encountered and cannot be reliably overcome by the read circuitry.

Figure 4:
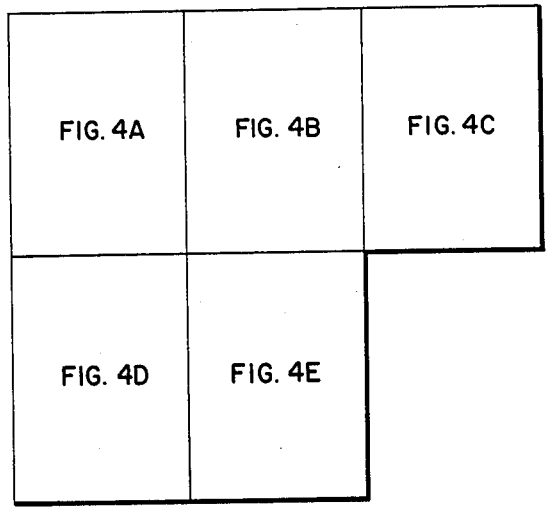
Figure 4A:
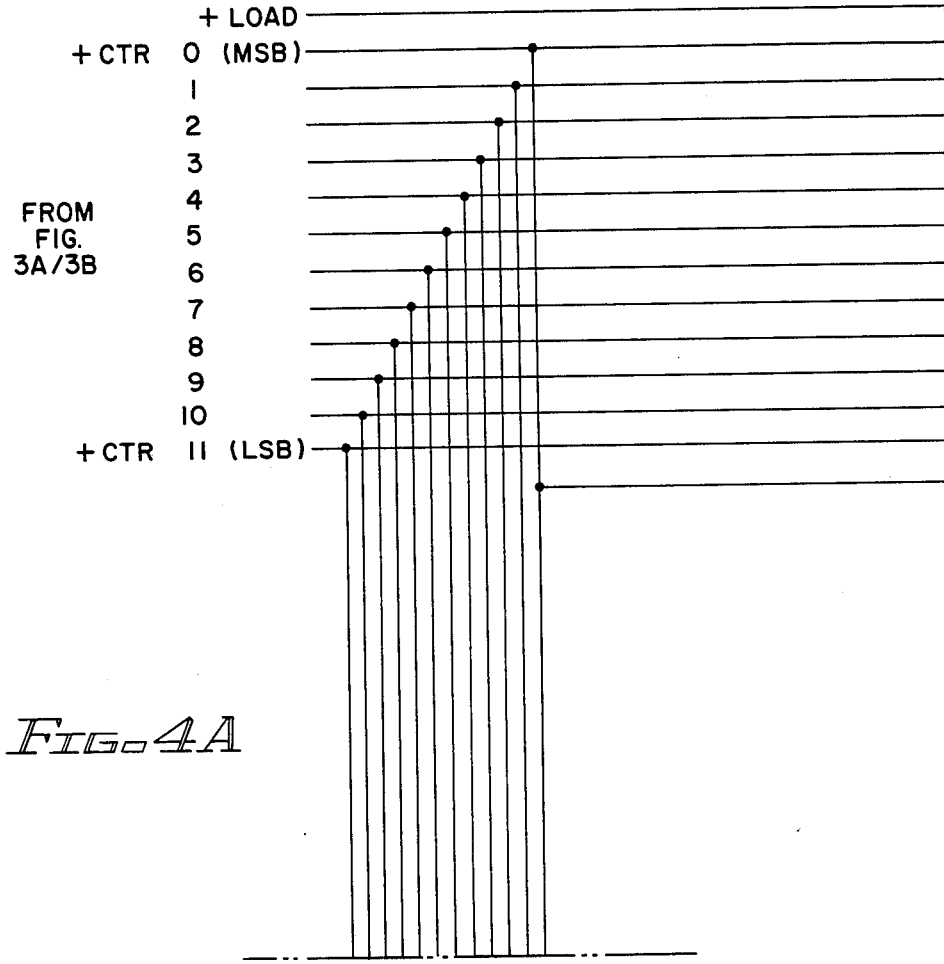
Figure 4B:
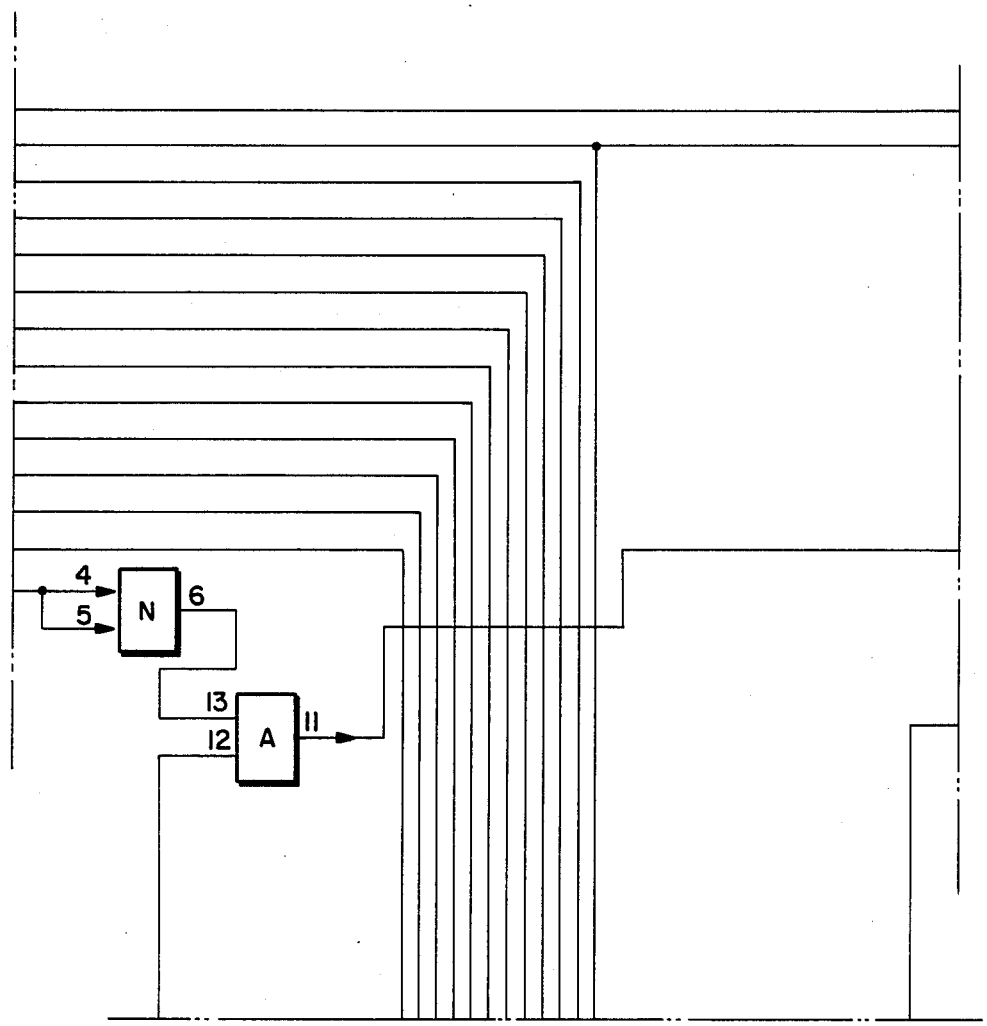
Figure 4C:
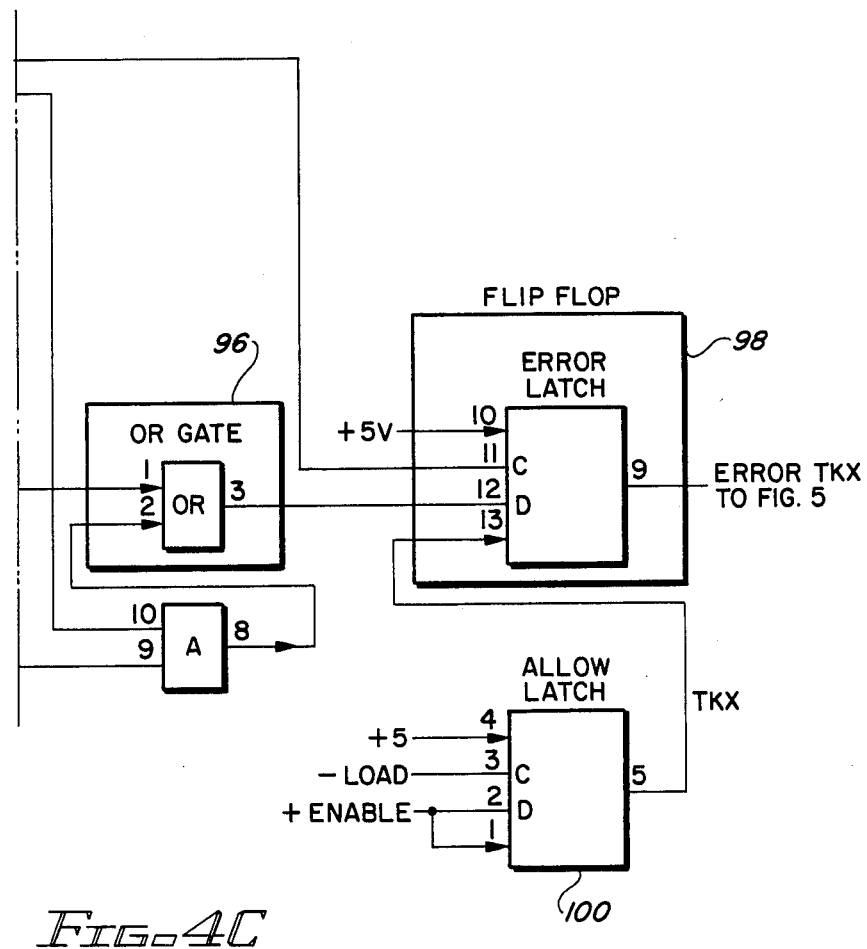
Figure 4E:
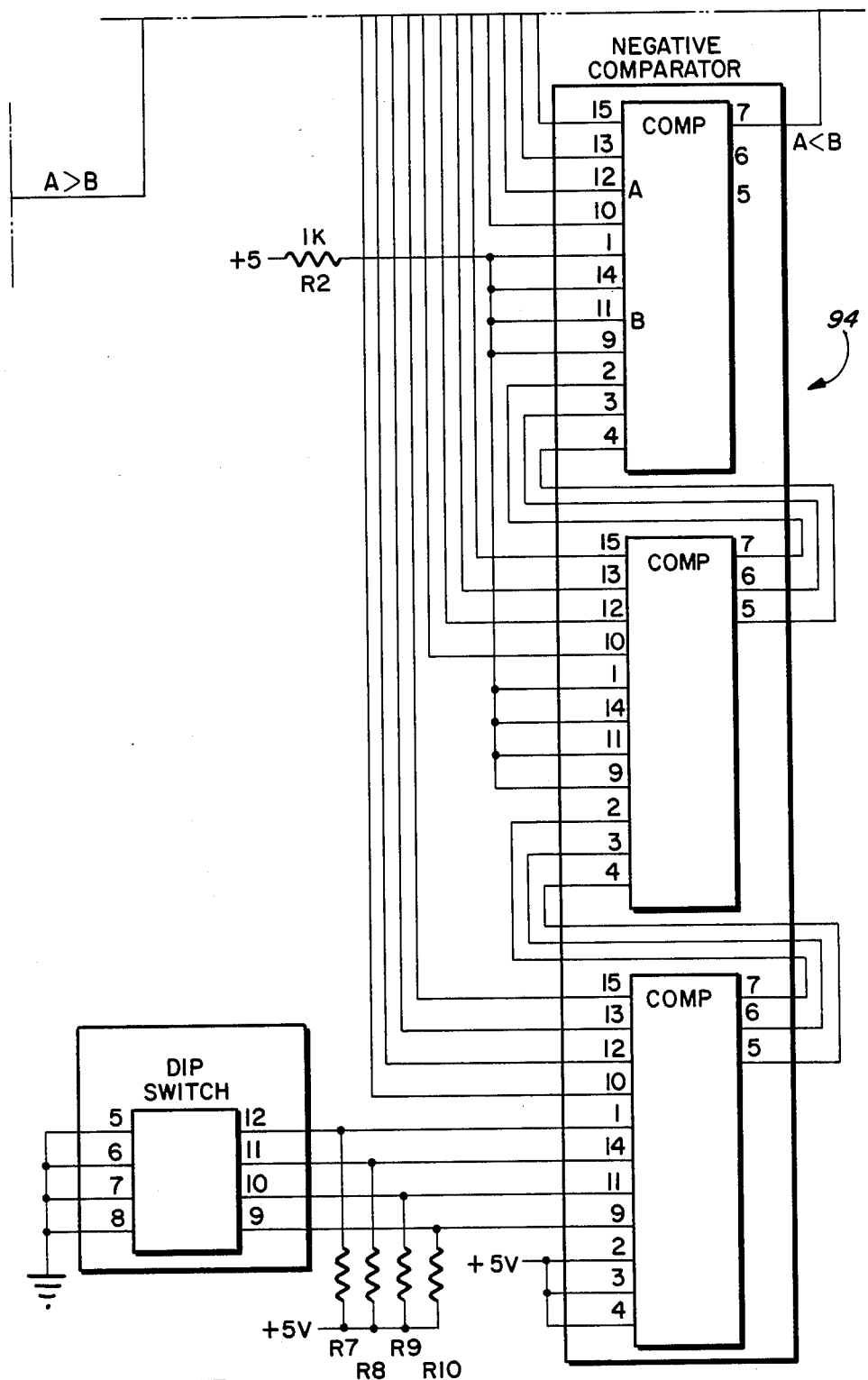
Figure 5:
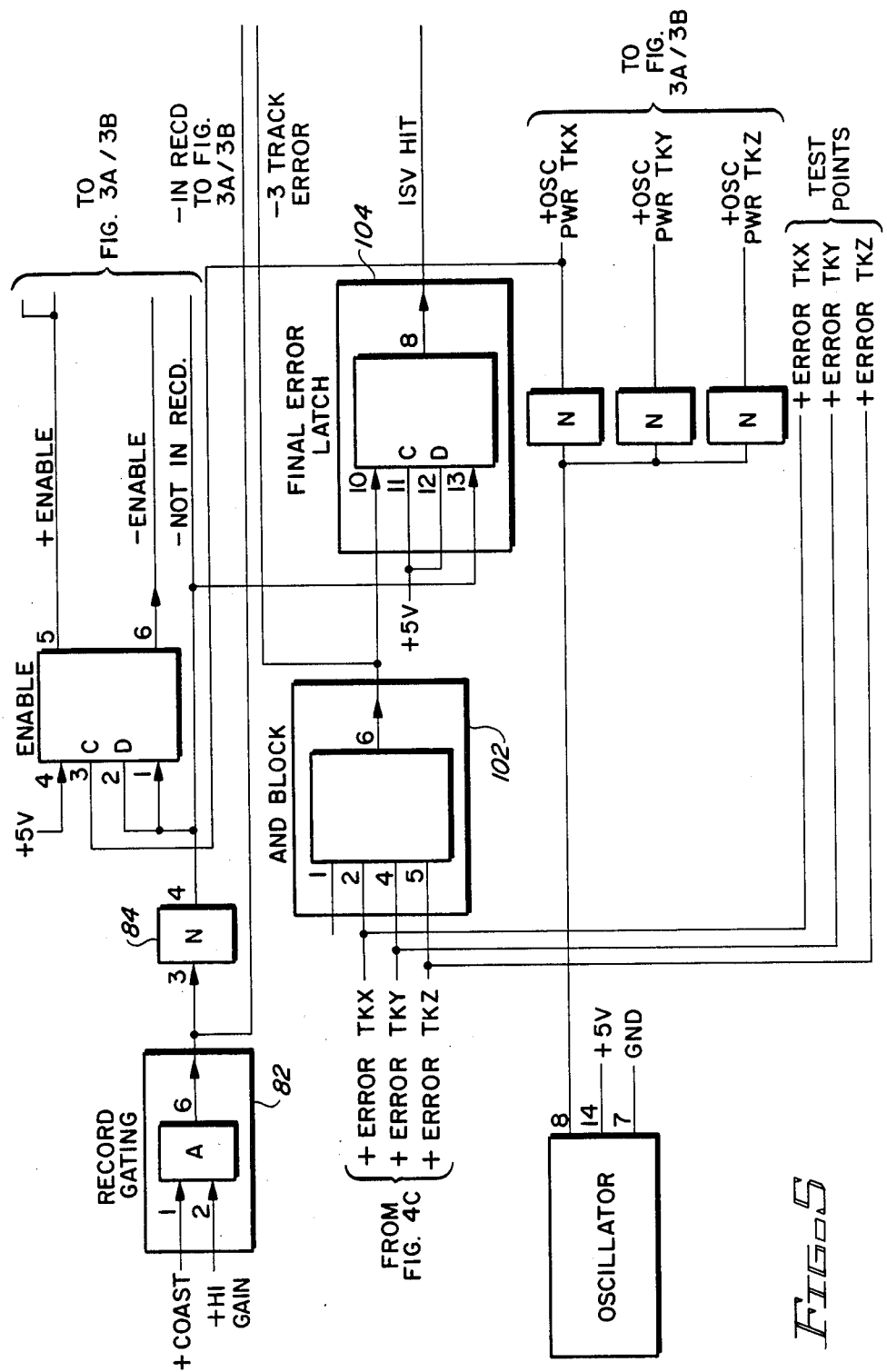
Figure 6A:
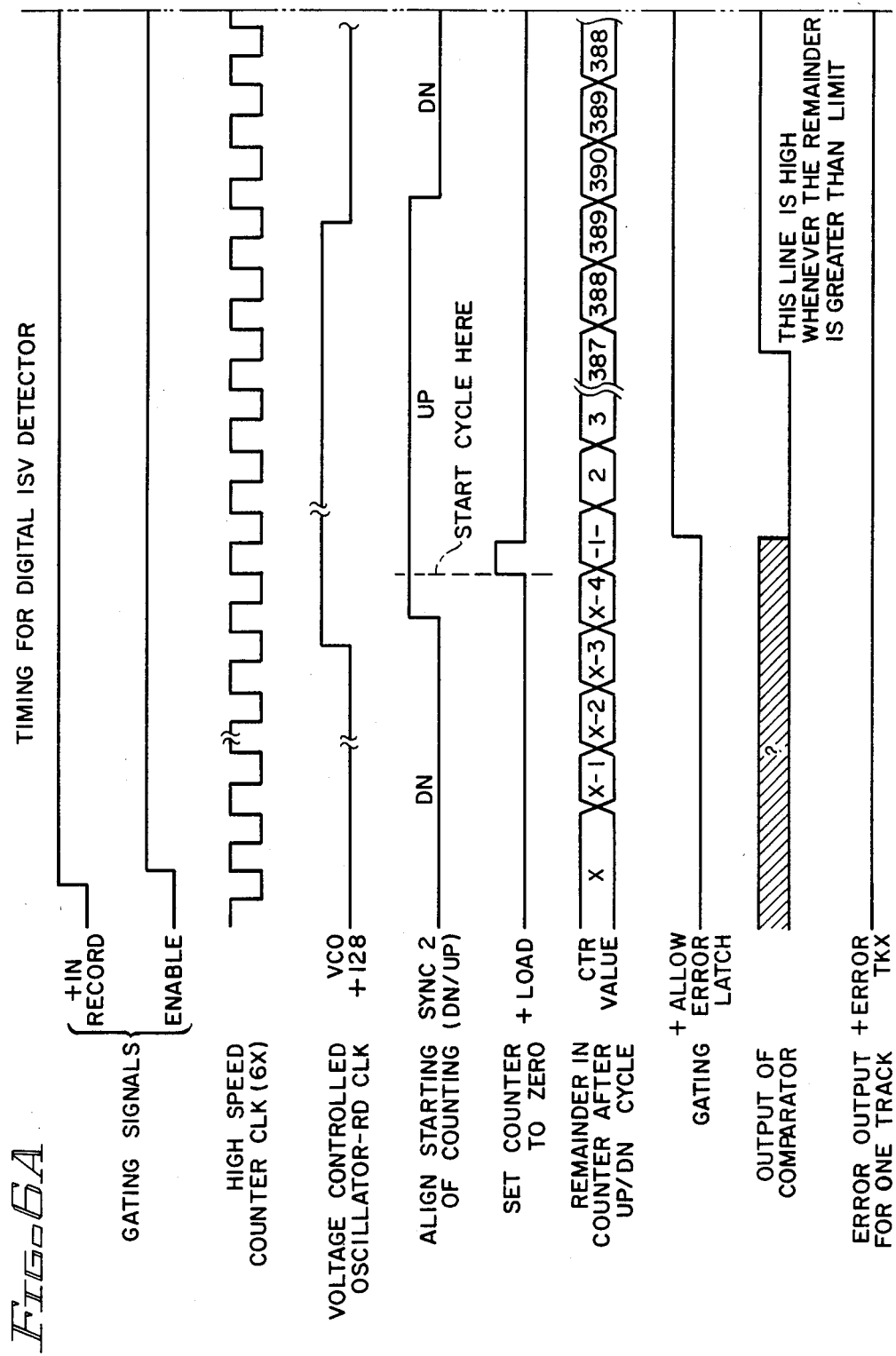
Figure 7:
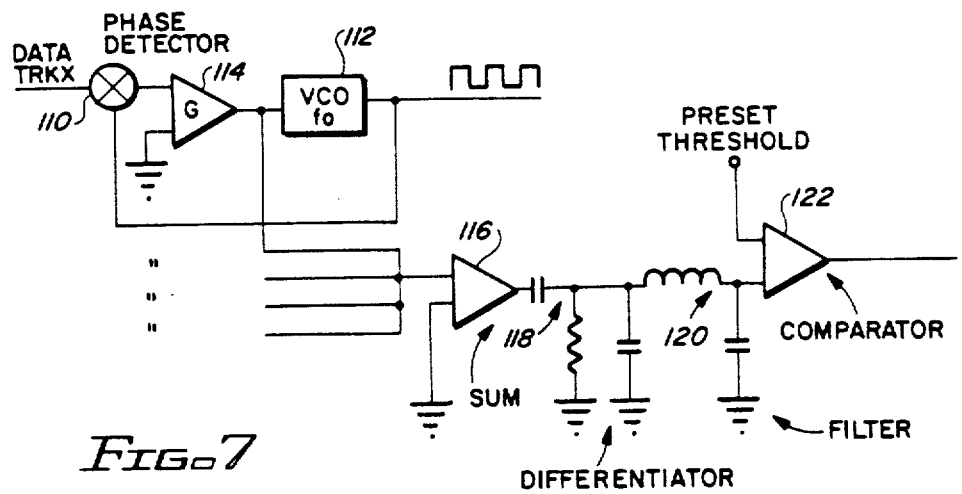
Figure 4C:
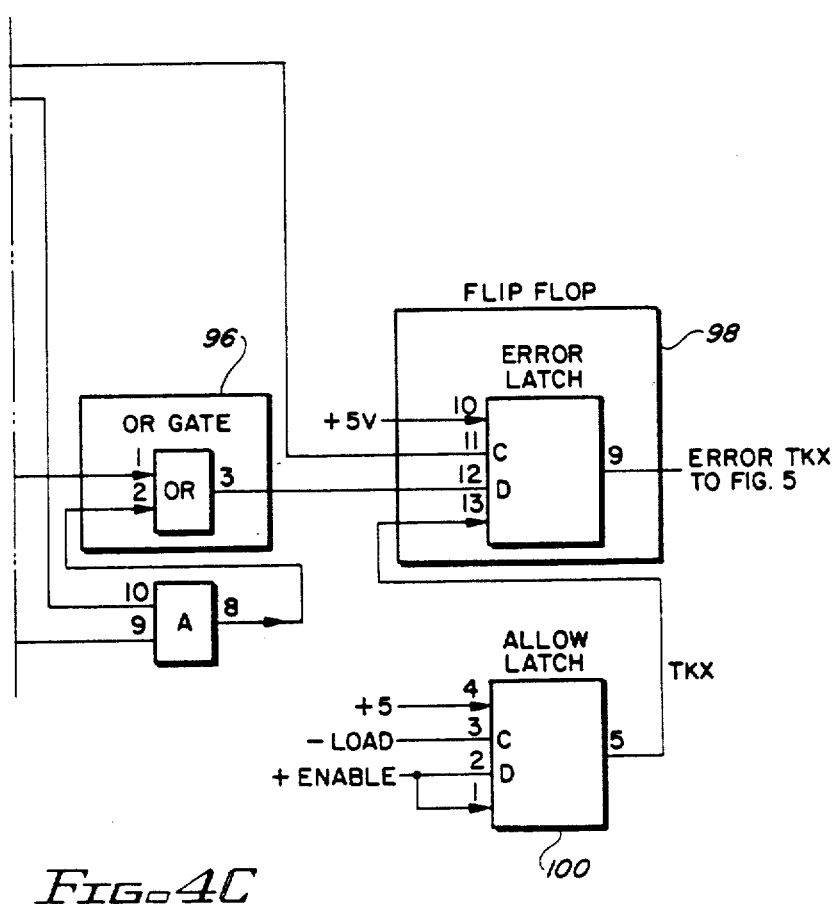

A more detailed showing of the digital ISV detector is provided in FIGS. 3A, 3B, 4A to 4E, and 5. FIGS. 6A and 6B show the key timing patterns used in the detector.

To initiate operation of the detector circuitry an in record signal is generated by the record gating AND gate 82 which responds to a Coast and High Gain signal from the tape subsystem control unit. The output of AND gate 82 correspondingly generates a "not in record" through the NOT gate 84 or an "in record" signal as shown in FIG. 5. Only the "in record" signal is shown in FIG. 6A as it is only when the tape subsystem is actively recording that it is necessary for the ISV detector circuit to be in its active state. When the tape head is over an inter-block gap area, the drive may stop and start and an indication of an instantaneous speed variation where the drive has properly stopped and restarted would be clearly erroneous.

The "in record" signal resets the count up and count down window counter 86. In the example shown, the counter 86 counts to 128. During the first 64 steps of the counter 86 a set of counters 88 counts up in response to a high speed counter clock signal as described more fully hereinafter. During the last 64 steps of the counter 86, the set of counters 88 counts down.

Synchronization between the up/down window counter 86 and the set of counters 88 is provided through an alignment flip-flop 90 which receives as inputs the high speed counter clock signal and the output of the up/down window counter 86. After the output of the up/down window counter 86 goes up and the next successive upward pulse of the high speed counter clock signal is received, the counting up cycle of the set of counters 88 is initiated when the synchronization signal from the alignment flip-flop 90 comes up. When the output of the up/down counter 86 comes down and a successive upward pulse of the high speed counter clock signal is received, the counting down cycle of the set of counters 88 is initiated when the synchronization signal from the alignment flip-flop 90 comes down. The set of counters 88 stop counting when the voltage controlled oscillator signal, the synchronization signal from the alignment flip-flop 90 and the high speed counter clock signal are all up. At this point, the count in the set of counters 88 is provided to the positive and negative comparators 92 and 94.

In the present example, the positive comparator 92 is set to a reference value of +5 and the negative comparator 94 to a reference value of −5. These values have been selected because they are consistent with the requirements of the particular system. Other designs may have higher or lower ISV tolerances and, therefore, more or less precise counting by the set of counters 88 may be required. Accordingly, any acceptable reference value could be placed in the comparators 92 and 94. In fact, in some instances, it may be desirable to put different absolute values in the positive and negative comparators 92 and 94 because, for example, an ISV which decreases the data rate may be more tolerable by the system than one that increases the data rate. Whenever the input from the set of counters 88 exceeds the preestablished threshold, in this example, +5 or −5, the output of the comparator 92 or 94 is high. The output of the positive and negative comparators 92 and 94 are provided through an OR gate 96 to an error latch 98. The error latch 98 is activated by the + load signal and a positive output from an allow error latch 100 so that the error latch 98 only provides an output indicating an error if the comparator 92 or 94 output exceeds the threshold at the time a counting cycle is completed.

The detector circuitry so far described in FIGS. 3A, 3B, 4A to 4E and 5 is provided for each track on the tape which is to be sensed for ISV's. Any number of tracks may be selected for ISV sensing, however, there is a trade-off to be made between the cost of providing circuitry for each selected track and the need to select a sufficient number of tracks to ensure that ISV's are isolated from other errors which may be encountered. In the embodiment shown in FIG. 3C, three tracks have been selected.

The outputs from the error latches 98 of each track circuit are combined in an AND gate 102. The AND gate 102 provides an output indicative of an error condition only when all three error latches 98 indicate an error condition. The tracks selected on the multiple track tape are sufficiently separate that the only condition that could affect all three tracks would be a condition effecting all of the tracks on the tape. The only case where such a condition would not be sensed by the normal error sensing and correcting circuitry of the tape drive would occur when the condition was created by an instantaneous speed variation or a transitory speed change of extremely short duration, or an oscillatory condition within the drive. Accordingly, the output from the AND gate 102 indicates a condition which may not be detected by the normal error sensing and correcting circuitry or may be unreadable during subsequent operations.

The output of the AND gate 102 is provided to a final error latch 104 which, when latched, will provide a signal indicating that the entire record of data should be considered in error and be subsequently rerecorded.

Figure 7:
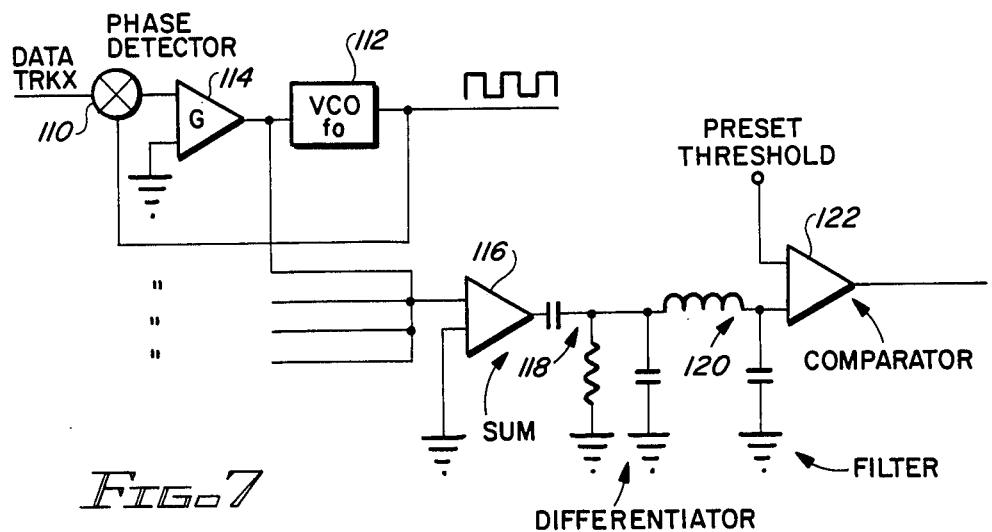
FIG. 7 is a block diagram of an analog implementation of an instantaneous speed variation detector circuit.

An analog implementation of the ISV detection circuitry is shown schematically in FIG. 7.

As with the digital implementation, a predetermined number of tracks across the width of the tape are selected. In the particular design, the data signal from each track is provided to a phase detector 110 which establishes a phase output signal representative of the phase difference between the received data signal and an output of a voltage controlled oscillator (VCO) 112. The phase difference signal is provided through a filter 114 as an input to the VCO 112 to alter the output of the VCO 112 so that it maintains phase with the data. The output of the filter 114 is also provided to a summing amplifier 116 for those tracks which have been selected to provide an indication of an instantaneous speed variation. The phase difference signal between the received data signal and the VCO output signal is a clear indicator of the amount of speed change during the detected data interval.

The phase difference signals from each selected track are provided to the summing amplifier 116 which provides an output representative of the sum of the phase deviation detected on all selected tracks. The output of the summing amplifier 116 is fed through a differentiator 118 and filter 120 to a signal comparator 122.

The comparator 122 is provided with a preset threshold input which determines the amount of phase deviation which can be accepted without indicating an error condition as a result of an instantaneous speed variation. Whenever the output from the summing amplifier 116 to the comparator 122 exceeds the predetermined threshold the comparator provides an output indicating an error condition caused by an instantaneous speed variation and requiring that the recorded data be rewritten.

Although the analog design has some advantages of economy with respect to the digital design it does have some technical disadvantages. For example, it is possible to identify an ISV situation where one track indicates a substantial phase error even though other tracks do not have such an error since the outputs of all selected tracks are summed together. This would only occur in the very unlikely case where the phase deviation in one track is extremely large. With the digital design this is not possible because each track must provide a positive indication of an error condition to the AND circuit. Consequently, the digital design will only provide an error signal when an ISV condition exists whereas the analog design may respond with an error signal situation where the condition is created by some source other than an ISV.

While the invention has been particularly shown and described with reference to preferred embodiments thereof, it will be understood by those skilled in the art that various changes in form and details are possible without departing from the spirit and scope of the invention.

What is claimed is:

1. In a multiple track digital recording system, apparatus for detecting unacceptable instantaneous speed variations in tape media comprising, for each of a preselected group of data tracks:

oscillating means for providing an oscillating signal in response to data signals recorded on said media, said oscillating means providing a signal of a frequency corresponding to a rate at which said data signals are received;

first counting means for dividing each said oscillating signal into a first portion and a second portion, said first portion providing a count up window and said second portion providing a count down window;

second counting means for counting in a first direction in response to said first group of signals and in an opposite direction in response to said second group of signals;

means for providing a high frequency input signal to said second counting means;

means for resetting said first counting means and said second counting means at the beginning of a data signal, said resetting means also providing the count of said second counting means to a comparator;

means for setting said comparator to a predetermined reference value;

means for providing an error signal from said comparator when said count exceeds said reference value; and said digital recording system further comprising an AND gate for receiving error signals from each comparator associated with a preselected track, said AND gate providing a final error signal only when all said comparators provide an error signal thereby indicating an unacceptable instantaneous speed variation.

2. In a multiple track digital recording system, apparatus for detecting media speed variations of short duration from data recorded on said media, comprising:

detection means for detecting a predetermined point in a data interval from data recorded in each of a plurality of recording tracks;

a plurality of counter means, one said counter means being associated with one of said plurality of recording tracks;

said detection means initiating a count cycle in said counter means in response to detection of said predetermined point;

means for stopping said count cycle in the respective counter means at a point in said interval following said predetermined point by a portion of said interval corresponding to one-half of an immediately preceding recorded interval and reversing the operation of said counters to count in the opposite direction during the portion of said interval following said point in said interval following said predetermined point; and means for stopping said count in the opposite direction upon detection of a corresponding predetermined point in a next data interval whereby the count remaining in said counters at the completion of said operation is representative of the difference in duration of successive data intervals.

3. Apparatus for detecting media speed variations as defined in claim 2 further comprising:

means for indicating an unacceptable speed variation when each counter means retains a count greater than a predetermined absolute value when counting is stopped at the predetermined point in said next data interval.

* * * * *

UNITED STATES PATENT AND TRADEMARK OFFICE
CERTIFICATE OF CORRECTION

PATENT NO. : 4,633,333

DATED : December 30, 1986

INVENTOR(S) : Alfred W. Blanco, et al

It is certified that error appears in the above-identified patent and that said Letters Patent is hereby corrected as shown below:

Figures 7 and 4C should appear as shown on the attached sheet, but will apply to the Grant Only.

Sheet 8 of 12, Figure 4D, (first occurrence) should be deleted. (Grant Only)

Signed and Sealed this

Twenty-first Day of April, 1987

Attest:

DONALD J. QUIGG

Attesting Officer     Commissioner of Patents and Trademarks